Aug. 20, 1968    R. D. HUNT ET AL    3,397,753
GAS-CUSHION VEHICLES WITH FLEXIBLE SKIRTS
Filed Feb. 17, 1966    3 Sheets-Sheet 1

INVENTORS
R. D. HUNT
A. R. TRIPP
BY
Cameron, Kerkam & Sutton
ATTORNEYS

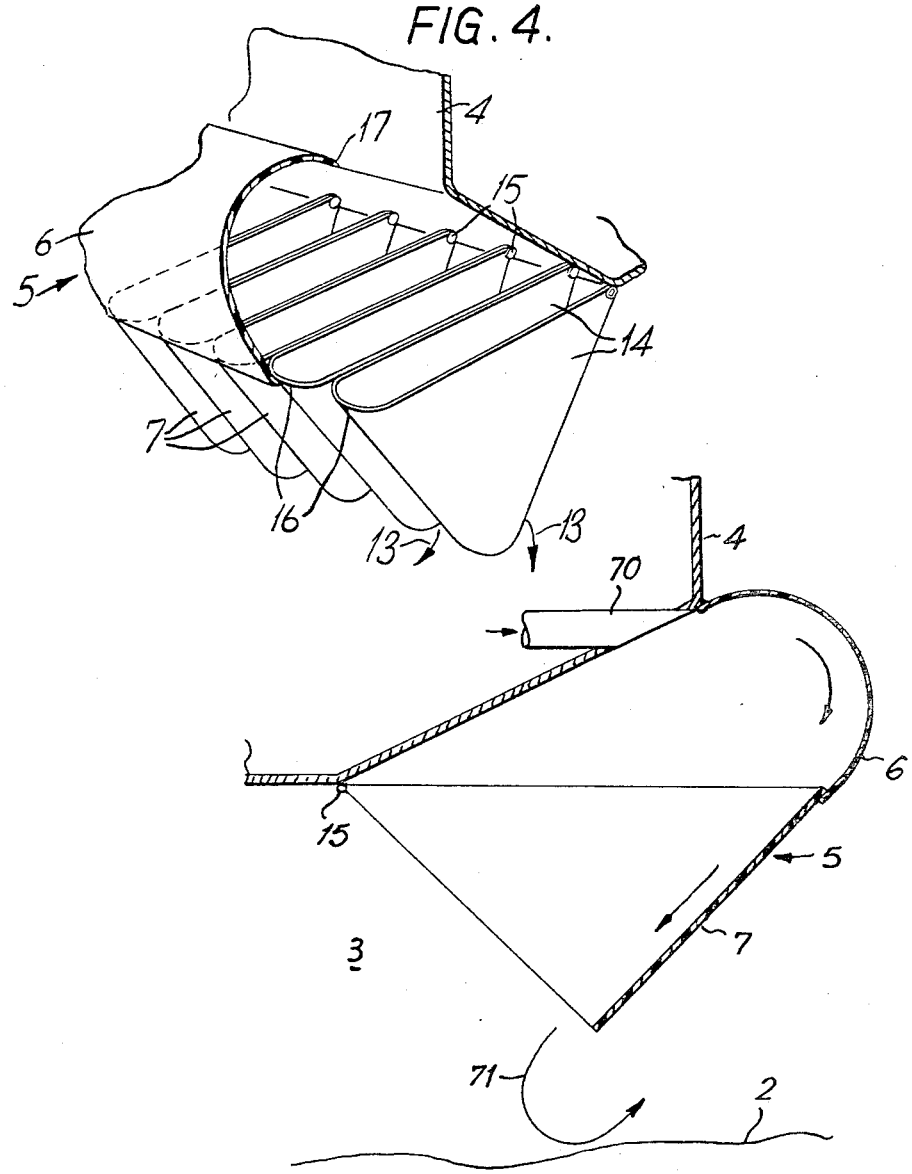

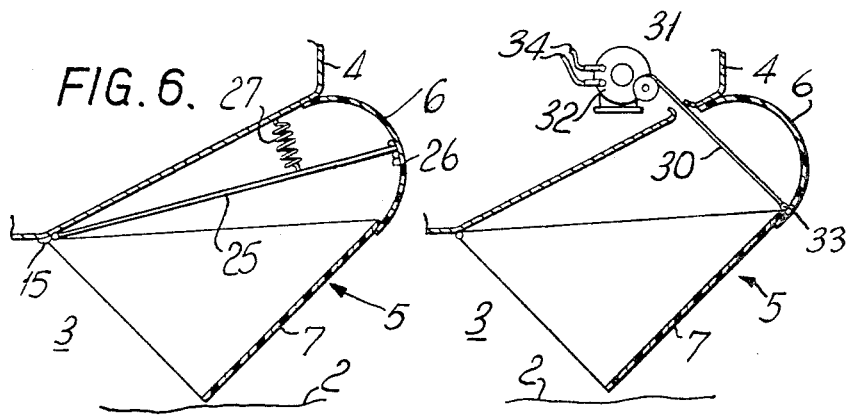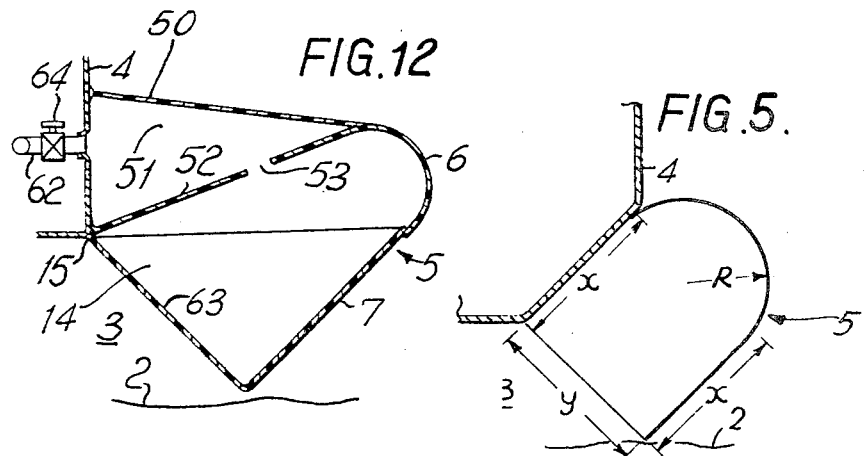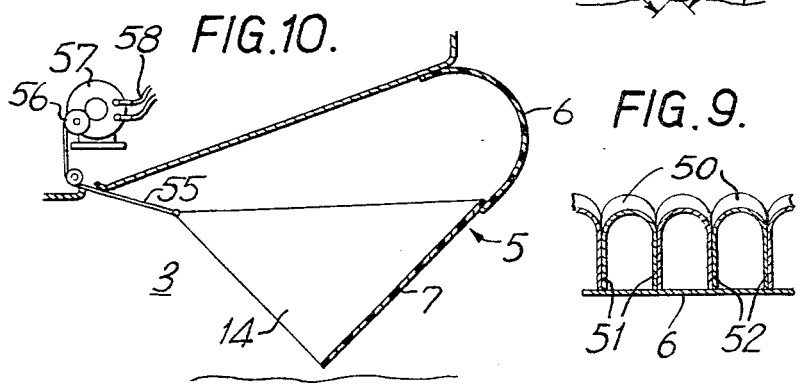

United States Patent Office
3,397,753
Patented Aug. 20, 1968

3,397,753
GAS-CUSHION VEHICLES WITH
FLEXIBLE SKIRTS
Rowland Delville Hunt, Hythe, Southampton, and Alan Ritson Tripp, Hedge End, Southampton, England, assignors to Hovercraft Development Limited, London, England, a British company
Filed Feb. 17, 1966, Ser. No. 528,238
Claims priority, application Great Britain, Feb. 24, 1965, 7,946/65
12 Claims. (Cl. 180—127)

ABSTRACT OF THE DISCLOSURE

An air-cushion vehicle is provided with a cushion-containing flexible wall or skirt which "follows" irregularities on the surface over which the vehicle travels. The skirt is of two-stage form, each stage being inflatable and formed so that inflation forces applied thereto tend to deflect the upper stage upwardly and the lower stage downwardly so as to place the skirt in an equilibrium position. The upper stage comprises a looped sheet of flexible material which bulges outwardly beyond the lower stage, and the lower stage comprises a succession of individual wall members of U-like lateral cross section.

---

Figure 1:
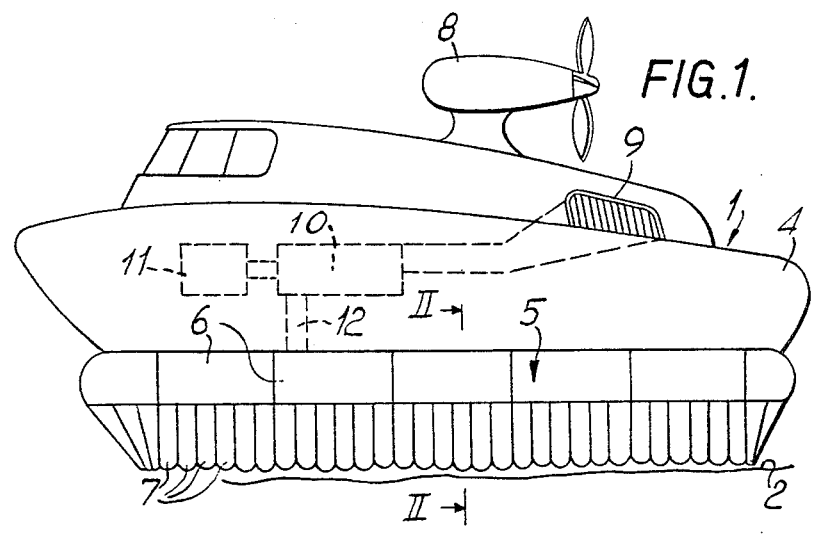

This invention relates to gas-cushion vehicles, that is to say to vehicles for travelling over a surface and which, in operation, are supported above said surface, at least in part, by a cushion of pressurised gas (usually air) formed and contained beneath the vehicle body. The invention is particularly suited (but is not to be restricted) to gas-cushion vehicles wherein the vehicle-supporting cushion is contained, at least in part, by a flexible wall attached to and depending below the vehicle body in close proximity to the surface beneath, gas surplus to cushion-forming requirements escaping to atmosphere between the bottom of wall and said surface.

To enable the vehicle to travel over irregular surfaces the wall is made flexible and flexibility is conveniently achieved by making the wall from flexible, sheet material, inflated to conform to a desired shape.

One form of inflatable wall (see copending application Ser. No. 316,852, filed Oct. 17, 1963, now Patent No. 3,291,237) comprises a member of flexible sheet material which, when inflated, has a vertical cross-section (viewed in a direction normal to the cushion periphery) extending initially outwardly, then downwardly, then inwardly and finally upwardly, relative to the cushion space, in a smooth curve between points of attachment on or to the vehicle body. The member deflects by a pivoting or cantilever movement about its points of attachment.

The flexibility of this form of wall, however, decreases as the radius of curvature of its cross-section is increased. A wall of large radius thus finds itself subjected to high tensile stresses which demand an increase in the thickness of the material from which it is constructed and this means an increase in weight and hence a corresponding increase in inertia, so that the wall becomes less flexible.

Another form of flexible wall (see copending application No. 566,948, filed July 21, 1966 as a continuation-in-part of now-abandoned application Ser. No. 267,695, filed March 25, 1963) comprises a plurality of wall members disposed in a row beneath the body of a vehicle, each wall member comprising a thin sheet of flexible material folded so as to have an outer portion facing the space occupied by the cushion and a pair of side or tie portions extending inwardly from said outer portion towards the cushion space. The outer portion of each wall member (and hence the side portions thereof) is subjected to tensile loading when inflated by the cushion.

An individual wall member of the latter form possesses adequate flexibility when deflected by forces directed either inwardly, towards the cushion space, or in a sideways direction, but has less flexibility when deflection forces are directed upwardly on the bottom edge of its outer portion, as under these conditions both the vehicle body and neighbouring wall members restrict vertical and sideways movement respectively of said individual wall member and so the latter cannot move out of line readily, but crumples from its bottom upwards.

According to the present invention, a gas-cushion vehicle has its cushion contained, at least in part, by a flexible wall attached to and depending below the vehicle body, said wall comprising upper and lower wall parts of flexible sheet material inflatable to conform to desired shapes, the upper wall part being attached to the vehicle body so as to deflect relative to the body, and the lower wall part being connected to the upper wall part so as to deflect therewith, the respective geometries of the wall parts being such that components of the loading forces applied to each wall member by inflation pressure tend to deflect the upper wall part in an upward direction and the lower wall part in a downward direction, so as to place the wall in an equilibrium position.

As the vehicle travels over irregular surfaces the bottom of the lower wall part and the surface beneath will inevitably come into contact, resulting in collapse of the bottom of the lower wall part and hence a corresponding reduction of the load applied to that part. An out-of-balance condition of the loading forces applied to each of the wall parts now results whereby the component of the loading force applied to the upper wall part overrides that applied to the lower wall part. The upper wall part will thus deflect upwardly, carrying the lower wall part with it, until a new position of equilibrium is found.

The wall may conveniently consists of a lower wall part comprising a succession of wall members constructed according to the disclosure of copending application Ser. No. 566,948, and an upper wall part of substantially part-circular form as seen in vertical cross-section. In such a wall, the radius of curvature of the upper wall part can be kept to a tolerable dimension. Furthermore, the individual lower wall members can deflect relative to each other, so that minor surface obstacles can be negotiated without undue deflection of the flexible wall as a whole.

Figure 2:
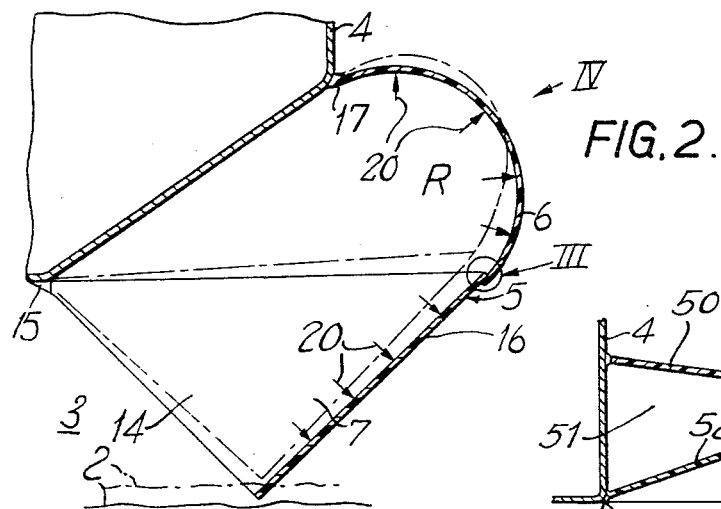
Figure 8:
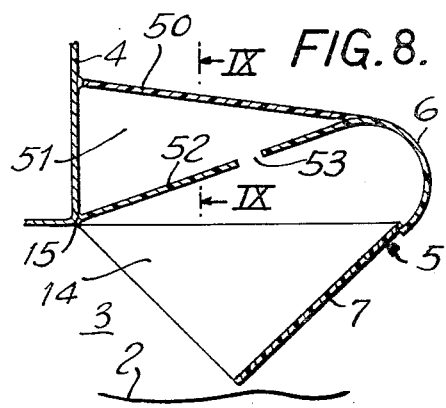
Figure 3:
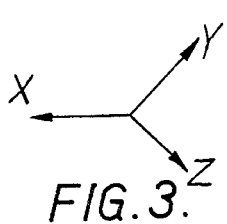

An embodiment of the invention will now be described by way of example with reference to the accompanying drawings wherein:

FIGURE 1 is a side view of a gas-cushion vehicle according to the invention,

FIGURE 2 is a section, to an enlarged scale, taken on the lines II—II of FIGURE 1, FIGURE 3 is a diagram of loads applied to the parts enclosed by the circle III of FIGURE 2, FIGURE 4 is a fragmentary view, in perspective, looking in the direction of the arrow IV of FIGURE 2, FIGURE 5 is a diagrammatic illustration of a simple form of flexible wall, FIGURES 6 to 8 illustrate different modifications of the arrangement of FIGURES 2 and 4, FIGURE 9 is a section taken on the lines IX—IX of FIGURE 8, FIGURES 10 and 11 are further modifications of the arrangement of FIGURES 2 and 4, and FIGURE 12 illustrates a modification of the arrangement of FIGURE 8.

Referring to FIGURES 1 to 4, a gas-cushion vehicle 1 of the plenum-chamber type, travelling over the surface 2 of water, is supported above the surface 2 by a cushion of pressurised gas (air) formed beneath the body 4 of the vehicle and contained thereunder by a flexible wall 5 attached to and depending from the periphery of the body 4. The interior of the wall 5 is open to the cushion 3.

The flexible wall 5 comprises upper and lower wall parts 6, 7 respectively, constructed from thin sheets of lightweight (e.g. 15 oz. per square yard) flexible material (rubberised fabric) inflatable to conform to the shape illustrated, the upper wall member 6 being attached to the vehicle body so as to deflect relative to the body. The lower wall part comprises a succession of lower wall members 7 connected to the upper wall member 6 so as to deflect therewith, the respective geometries of the wall parts being such that (as explained hereinafter) components of the loading forces applied to each wall part by inflation pressure tend to deflect the upper wall part in an upward direction and the lower wall part in a downward direction so as to place the wall 5 in an equilibrium position whereby the bottom of each wall member 7 is maintained in light contact with the surface 2 beneath the vehicle 1.

In further detail, the vehicle 1 is propelled over the surface 2 by an air-screw propeller unit 8. The cushion 3 is formed by drawing in atmospheric air through side intakes 9, raising its pressure in a compressor 10 driven by an engine 11 and then discharging the compressed air, by way of a duct 12, to beneath the bottom of the vehicle body 4. Air excess to cushion forming requirements escapes to atmosphere through small gaps between the bottoms of adjacent wall members 7, as indicated by the arrows 13 in FIGURE 4.

The bottom wall members 7 are of the kind disclosed in copending application Ser. No. 566,948, each comprising a sheet of rubberised fabric of generally triangular shape folded to define a concavity, the hollow 16 of which is presented towards the cushion 3, a side portion 14 of each wall member 7 being contiguous with the adjacent side portion of a neighbouring wall member. The interiors of the wall members 7 are open to the cushion 3 and the side portions 14 extend inwardly to pivotable anchorages 15 to serve as ties for constraining the wall members against deflection away from the cushion space by the pressure of air therein. The arrangement is such that, in operation, cushion air enters the concavities of the wall members 7 so as to urge the contiguous side portions 14 of neighbouring wall members towards each other to effect a cushion seal.

To maintain each wall member 7 taut and to ensure that the whole of the load acting on the interior of a hollow 16 is distributed in such a manner that thin light materials can be used for manufacturing wall members 7, the inner edges of the side portions 14 are substantially at right angles to the hollows 16 of the concavities. An angle substantially greater than 90° (e.g. 100°) means the use of superfluous material. An angle substantially less than 90° (e.g. 80°) means that the loads in the side portions 14 have to follow sharply deviating paths from a concavity 16 to the structure which accepts the loads. Ideally these paths should be at right angles to the concavity 16. The external surfaces of the concavities 16 are inwardly inclined towards the cushion 3, are in planes substantially tangential to the wall part 6, and make an angle of substantially 45° with the mean level of the surface 2.

The upper wall part 6 comprises rectangular sheets of rubberised fabric each extending (see FIGURE 2) initially outwardly, then downwardly, and inwardly (relative to the cushion 3), in a smooth curve between an anchorage point 17 along a side part of the vehicle body 4 and the concavities 16 of a group or succession of bottom wall members 7.

The interior of the wall part 6 is open to the cushion 3, and under normal operating conditions, is inflated thereby to assume a substantially semi-circular (vertical) cross-section, the radius of curvature R of which is disposed outboard of anchorage point 17.

Cushion pressure acting on the inner surfaces of the wall parts 6, 7, as indicated by the arrows 20, subject the wall parts to the loads represented by the components X, Y, Z of FIGURE 3. Component X represent the tensile load in the side portions 14 of the wall part 7 which load is taken by the anchorage 15; components Y represent Z the (hoop) load in the wall part 6 and component Z the cushion pressure load on the concavities 16 of the wall part 7. The geometries of the wall parts 6, 7 are such that the components X, Y, Z, act in opposition to place the wall 5 in an equilibrium position whereby (in this example) the bottoms of the wall members 7 just touch the surface 2. For example, with reference to the simple form of wall 5 of FIGURE 5, wherein dimensions $x$ and $y$ are equal and $R = y/2$:

Let $p$ = pressure of cushion 3 (above atmosphere)
$T$ = loop stress in wall part 6
$P$ = load acting on hollows 16 of wall part 7.

Taking moments about anchorage 15, $$T \cdot y = P \cdot \frac{x}{2}$$

$$\therefore (p \cdot R) y = (p \cdot x) \frac{x}{2}$$

$$\therefore p \cdot R \cdot y = p \cdot \frac{x^2}{2}$$

Cancelling $p$ from both sides of the equation, and substituting $y/2$ for R and $y$ for $x$, $$\frac{y}{2} \cdot y = \frac{y^2}{2}$$

$$\therefore \frac{y^2}{2} - \frac{y^2}{2} = 0$$

The wall 5 is therefore in equilibrium.

Component X has been ignored in the above calculation as it is an "internal" load and does not affect the balance of the wall.

The equilibrium position of the wall 5 can be varied, for example, by increasing or decreasing the loop radius R of the wall part 6 so as to vary the hoop tension therein. This variation will vary the relative position of the wall members 7 and the ground surface 2.

In operation, consider the wall 5 as viewed in FIGURE 2 to encounter the crest of a wave. The wall members 7, being of thin, light material are insufficiently strong in compression to resist the impact of the wave and begin to collapse, from their bottoms upwards.

Collapse of the wall member bottoms results in a temporary shedding of their loads over the portions of collapse, reducing the magnitude of the components Z and so disturbing the balance of the components X, Y and Z. With component Z reduced in magnitude, there is a change in moment arm resulting in an upward deflection of the interconnected wall parts 6, 7, in toto, about the anchorages 15, as indicated by the dotted lines of FIGURE 2, until a new position of equilibrium is reached. If the vehicle to surface clearance is restored to what it was originally, the wall 5 will return to its original position of equilibrium.

Flexibility of the wall 5 is enhanced by the ability of a wall member 7 to deflect relative to its neighbour so that minor surface irregularities can be negotiated without undue deflection of the wall 5 as a whole.

It is possible that, under certain operating conditions of the vehicle (for example, over water), the application of drag forces can results in the lower parts of the wall being drawn under the vehicle body. To reduce the possibility of this occurring, the wall can be provided with means limiting downward deflection. Two different examples of walls 5 provided with such means are illustrated in FIGURES 6 and 7.

In FIGURE 6 the deflection-limiting means includes struts 25 pivotally attached to the vehicle body 4 at the anchorages 15 and extending radially outwards to attachment points 26 on the inner surface of the wall part 6. Substantial downward deflection of the wall 5 (and hence the struts 25) is restricted by tension in restraint-cords 27 extending between the body 4 and intermediate parts of the struts 25. In FIGURE 6 the restraint-cords 27 are shown in their normal, non-tensioned or slack condition. It will be appreciated that the cords 27 can be replaced by other members of filamentary form.

In FIGURE 7 the deflection-limiting means comprises one or more tie-cords 30 wound on a winding drum 31 driven by an electric motor 32 and extending to an anchorage point 33 on the inner surface of the wall part 6. The motor 32 is under the control of the pilot of the vehicle through electrical signal lines 34. Downward deflection of the wall 5 is restricted by tension in the tie-cord 30. The limit of deflection can be varied by winding up or paying-out the tie cord 30 so as to alter the effective length thereof. The effective length of the tie-cord 30 can also be altered for vehicle trim purposes, for example, whereby the centre of pressure of the cushion 3 is shifted, relative to the centre of gravity of the vehicle.

With reference now to FIGURES 8 and 9, a plurality of discrete tie members 50 can be used to provide suspension support of the flexible wall 5 from side parts of the vehicle body 4. The tie members 50 are made from sheets of thin rubberised fabric, formed in a manner similar to the wall members 7, but positioned so that the hollows of the wall members 50 are presented towards the upper wall part 6. Tension loads in the members 50 are transmitted through the side portions 51 of the members to vertically-orientated side parts of the vehicle body 4. Upward deflection of the wall 5 is accommodated by collapse of the tie members 50 and (limited) downward deflection by tension in the members. The arrangement provides a simple, light and inexpensive support on which to suspend the flexible wall 5. The sides 51 and the bottoms 52 of the tie members 50 are attached, in a pressure-tight manner, to the side of the vehicle body 4 and top surface of the wall part 6 respectively. Apertures 53 connect the respective interiors of the tie members 50 and wall part 6, whereby the tie members 50 are inflated by air from the wall part 6.

With reference to FIGURE 10, the inner edges of the side portions 14 of the wall members 7 need not be attached directly to the vehicle body but can be attached thereto by tie-cords 55. By adjusting the effective lengths of the tie cords, for example, by winding the cords on drums 56 driven by electric motors 57 under the control, through electrical signal lines 58, of the vehicle pilot, the centre of pressure of the cushion 3 can be shifted, relative the centre of gravity of the vehicle.

In a modification of any of the above-described examples, such as that of FIGURE 8 a wall 5 can be inflated by a pressure source separate from and other than the cushion 3. For example, with reference to FIGURE 12, through a tapping 62 of the duct 12 of FIGURE 1. If desired, this modification can include making the wall 5 of "closed" shape by filling in the otherwise open parts of the wall members 7 with flexible wall means in the form of panels 63 which extend between the inner edges of each pair of side portions 14. The wall inflation pressure can be varied by means of a flow control valve 64 fitted in the tapping 62.

With reference to FIGURE 11, the flexible wall may have means for causing a curtain 71 to issue from the bottom of the lower wall part 7. The curtain 71 cooperates with the wall 5 to contain the cushion 3. The air forming the curtain 71 is supplied from a duct 70 connected to the outlet of the air compressor 10 (FIGURE 1) and is discharged from the duct to flow over the interiors of the wall parts 6, 7, to issue as the curtain 71 from the bottom of the lower wall part 7. It is expected, however, that the wall will not deflect upwardly until a reduction in vehicle to ground clearance is sufficient to cause the bottoms of the wall members 7 to crumple.

In a further (non-illustrated) modification, the vehicle-supporting cushion 3 is contained for part of its periphery by a flexible wall 5 substantially as illustrated in any of FIGURES 2 to 5, singly or in combination, and for another part thereof by a flexible wall 5 substantially as illustrated in FIGURE 11.

We claim:
1. A gas-cushion vehicle wherein the cushion is contained, at least in part, by a flexible wall attached to and depending below the vehicle body, said wall comprising upper and lower wall parts of flexible sheet material inflatable to conform to desired shapes, the upper wall part being attached to the vehicle body so as to deflect relative to the body, and the lower wall part being connected to the upper wall part so as to deflect therewith, said upper wall part comprising a sheet of flexible material which, in its normal inflated attitude, extends from its point of attachment to the vehicle body outwardly, then downwardly and inwardly to its point of connection to the lower wall part so as to bulge outwardly beyond the lower wall part, said lower wall part comprising a succession of individual, separately formed wall members each defining a concavity, the hollow of which is presented towards the cushion, the external surfaces of said concavities being inwardly inclined towards the cushion, each lower wall member having a pair of side portions extending inwardly towards the cushion and being contiguous with the adjacent side portions of the neighbouring wall members, the entire interior of each of said lower wall members being open to the cushion and to the interior of the upper wall part, and tie means for constraining the lower wall members against deflection away from the cushion by the pressure thereof, whereby gas from the cushion enters the interiors of the upper and lower wall parts and applies loading forces thereto having components which tend to deflect the upper wall part in an upward direction and the lower wall part in a downward direction so as to place the wall in an equilibrium position.

2. A vehicle as claimed in claim 1 wherein the angle between the inner edges of the side portions of each wall member and the concavity thereof is within the range of more than 80° and less than 100°.

3. A vehicle as claimed in claim 1 having means for causing a fluid to issue from the bottom of the lower wall part so as to cooperate with said flexible wall in containing said vehicle-supporting cushion.

4. A vehicle as claimed in claim 1 including a plurality of tie cords connecting the inner corners of the side portions of said lower members to the vehicle body, and means for varying the effective length of said tie cords.

5. A vehicle as claimed in claim 1 wherein, in the normal attitude of the wall, at least the major portion of the exterior of said upper wall part has a vertical cross section of substantially part-circular form.

6. A vehicle as claimed in claim 5 wherein the radius of curvature of said major portion is disposed outboard of the point of attachment of the upper part of said major portion to the vehicle body.

7. A vehicle as claimed in claim 5 wherein the concavities of said wall members are inclined towards said cushion in planes substantially tangential to said major portion of said upper wall part.

8. A vehicle as claimed in claim 1 provided with means for limiting downward deflection of said flexible wall.

9. A vehicle as claimed in claim 8 including a strut member disposed within and attached at one end to the flexible wall and pivotally attached at its other end to the vehicle body, and wherein said deflection limiting means comprise restraint means of filamentary form disposed within the flexible wall and extending between the vehicle body and said strut member, said restraint means normally being in a slack condition when the flexible wall is in its normal inflated attitude and serving as tie means consequent to substantial downward deflection of the flexible wall from said normal attitude.

10. A vehicle as claimed in claim 8 wherein said deflection limiting means comprise tie means disposed within the flexible wall and extendng between the vehicle body and a part of the flexible wall, and means for varying the effective length of said tie means.

11. A vehicle as claimed in claim 8 wherein said deflection limiting means comprise tie means disposed external said flexible wall and extending between said wall and the vehicle body, said tie means comprising a succession of flexible tie members of flexible material, each defining a concavity the hollow of which is presented towards the upper wall part, a side portion of each tie member being contiguous with the adjacent side portion of a neighbouring tie member, the side portions of each tie member being attached to the upper edges of the upper wall part, and means for inflating the tie members.

12. A vehicle as claimed in claim 11 wherein said means for inflating the tie members include apertures in the upper surface of the upper wall part whereby inflation gas can flow therefrom into the concavities of said tie members.

References Cited

UNITED STATES PATENTS

| | | | |
|---|---|---|---|
| 3,302,738 | 2/1967 | Bingham | 180—7 |
| 3,318,404 | 5/1967 | Hopkins et al. | 180—7 |
| 3,321,039 | 5/1967 | Watts | 180—7 |

FOREIGN PATENTS

| | | |
|---|---|---|
| 1,359,375 | 3/1964 | France. |

A. HARRY LEVY, *Primary Examiner.*